Nov. 26, 1963 C. H. HEISE 3,112,099
SIEVING AND MIXING MACHINE FOR PROCESSING AND
LOADING BUILDING MATERIALS
Filed March 11, 1960 8 Sheets-Sheet 5

INVENTOR
CARL HERMANN HEISE

By Toulmin & Toulmin
Attorneys

Nov. 26, 1963 C. H. HEISE 3,112,099
SIEVING AND MIXING MACHINE FOR PROCESSING AND
LOADING BUILDING MATERIALS
Filed March 11, 1960 8 Sheets-Sheet 7

INVENTOR
CARL HERMANN HEISE

By Toulmin & Toulmin
Attorneys

Nov. 26, 1963 C. H. HEISE 3,112,099
SIEVING AND MIXING MACHINE FOR PROCESSING AND
LOADING BUILDING MATERIALS
Filed March 11, 1960 8 Sheets-Sheet 8

FIG. 11

INVENTOR
CARL HERMANN HEISE

By Toulmin & Toulmin
Attorneys

United States Patent Office 3,112,099
Patented Nov. 26, 1963

3,112,099
SIEVING AND MIXING MACHINE FOR PROCESSING AND LOADING BUILDING MATERIALS
Carl Hermann Heise, Alfeld (Leine), Germany, assignor to Alfelder Eisenwerke Carl Heise Kommandit-Gesellschaft, vormals Otto Wesselmann & Cie., Alfeld (Leine), Germany
Filed Mar. 11, 1960, Ser. No. 14,411
Claims priority, application Germany Apr. 2, 1959
4 Claims. (Cl. 259—145)

The present invention relates to machinery used in the building trade, and more in particular to a sieving and mixing machine for processing and loading building materials, such as especially bituminous materials used in the construction of roads and highways.

It is known in the art to provide mobile asphalt plants for preparing and processing bituminous road building materials. These mobile plants usually comprise a rotary drier wherein gravel is dried and charged, together with bituminous material to a sieving and mixing machine by means of a hot material bucket conveyor. The sieving and mixing machines usually comprise a mobile machine frame supporting a mixing tower, and a hot material bucket conveyer feeding the materials to the mixing tower where they are mixed. The known machines may be further equipped with a charging elevator feeding the mixed material received from the mixing tower into a storage tank, onto a truck or similar vehicle.

The known machines are bulky and in view of the considerable weight and size of the mixing tower and the bucket conveyer the transportation of the mobile vehicle supporting the same is rendered rather difficult and time consuming.

It is the general object of the present invention to provide an improved sieving and mixing machine for processing and loading road building materials.

It is a particular object of the present invention to provide a machine of the above-referred-to type wherein the mixing tower and the bucket conveyer can attain a great capacity without exceeding prescribed railroad dimensions and without rendering transportation of the machine unduly obstructive and complicated.

It is another object of the invention to provide a machine of the type referred to which is so devised that the mixing tower and the bucket conveyer can be moved from an operating position to a far less obstructive transportation position by means of powerful, simple, robust, and reliable mechanical means remaining fully operative even after continued use in the rough service which is quite usual in the building trade.

Still another object of the invention is to provide a machine of the above-mentioned type which is so constructed that repairs can be easily performed underneath the mixing tower.

These objects are achieved by the present invention according to which a machine frame is provided having an arch-shaped configuration supporting on its central uppermost part the mixing tower consisting of an upper part and a lower part, and mechanical winch means for moving the upper part of the mixing tower in a pivoting motion by substantially 180° into the space comprised by the machine frame, the latter constituting the transport position.

At one end of the machine frame the latter has hook-shaped end portions constituting a bearing in which the bucket conveyer is pivotably positioned and about which the bucket conveyer can be pivoted from its work position to the transport position in which the bucket conveyer contacts the ground with a pair of wheels and is trailed by the mobile machine frame. Further winch means are provided for pivoting the bucket conveyer.

The winch means for displacing the upper part of the mixing tower from the work position to the transport position are mechanical rather than hydraulic, as such mechanical means are far sturdier and more reliable even after continuous use in the very rough service which is the custom in the building trade.

These mechanical means may consist of hand winches and racks. For example, a first winch is provided at one side and a second winch at the other side of the machine frame, one winch operating as the pull winch and pull brake, and the other winch operating as a push winch and push brake; preferably the two winches may operate in a predetermined manner illustrated further below, when moving the upper part of the mixing tower from the work position to the transport position and vice versa.

The invention will be more fully appreciated upon the following description of the accompanying drawings, wherein—

Referring now to the drawings more in detail, FIGURES 1, 2, 3, and 7 show the chassis of mobile machine frame of the machine of the invention. As will be seen from the drawings, the machine frame 1 has an arch-like configuration with the upwardly bulged central portion extending substantially horizontal and forming the top portion of the frame. The machine frame is supported by two pairs of wheels 3 and 4. The top portion 1a of the frame supports the mixing tower with the mixer, having a lower portion 4a and an upper portion 4b. The upper portion 4b of the mixing tower is rigidly connected with pivoting arms 4c and the latter connected with crankshaft 5. At its free ends crankshaft 5 bears a first crank 5a and oppositely thereto a second crank 5b.

Crankshaft 5 is positioned on the arched portion 1b of the machine frame 1 by means of bearing blocks 1e. The upper portion 4b of the mixing tower can thus be positioned about crankshaft 5 by 180° and can be positioned within the free space of the frame. The pivoting movement of the mixing tower is effected by means of a first hand winch 6 and a second hand winch 7 mounted on either longitudinal side of machine frame 1 and pivoted at bearing journals 6b and 7b, respectively. The winches 6 and 7 operatively engage the racks 6a and 7a. At their respective free ends racks 6a and 7a have longitudinal holes 7c which latter engage the crank pins of the cranks 5a and 5b. As will be seen from FIGURE 1, the cranks 5a and 5b are mounted on crankshaft 5, and they are spaced from each other by about 60°. One of the two winches, for example winch 6, is a pull winch and pull brake, whereas the other winch, for example winch 7, is a push winch and push brake.

Having thus described the structure of the means for moving the mixing tower, attention will now be turned to means of the invention for moving the bucket conveyer with which the mixing machine of the invention is equipped and which is provided for conveying hot materials into the mixing tower whenever both the mixing tower and the conveyor are in their respective working positions.

The machine frame 1 has a bent, hook-shaped end portion 1d and, at this end, has a box-shaped cross section, whereas the other portions of the frame have an I-shaped cross section. At its free end the hook-shaped end portion 1d of the machine frame 1 constitutes a bearing 2a for the pivoting shaft 2 of the hot bucket conveyer 8. (See FIGURES 4, 5 and 6.) The machine frame 1 has bearing blocks for positioning therein pivotably and displaceably winches 10, the bearing being designated with 10a. The winches engage racks 10b and have hand cranks 10c. The racks 10b of winches 10 are operatively connected to the journal bearings 8a of the bucket conveyer.

The upper part of the mixing tower which must be pivoted has a considerable weight which generally is in the order of about 5000 kg. In view of this great weight and since the upper portion must perform a movement of about 180° and in order to assure a safe and reliable operation, the two end winches 6 and 7 must be designed and must operate and co-operate in the predetermined load cycle as illustrated in FIGURES 8, 9, and 10.

Figure 8:
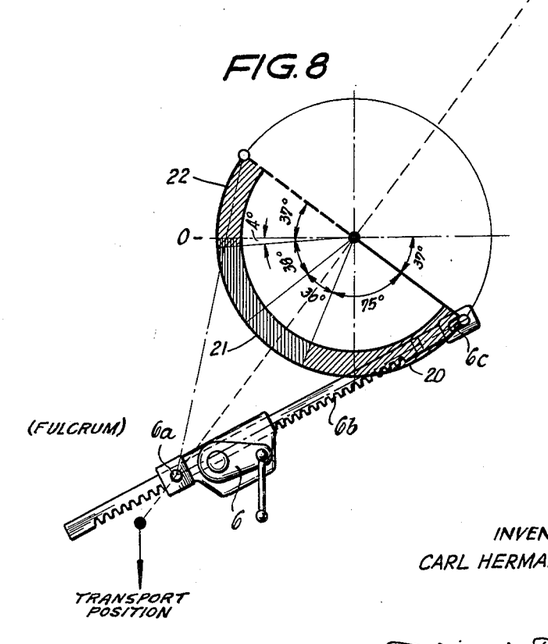
FIGURE 8 is a diagram, illustrating the operation of the pull winch.

If the mixing tower is to be moved, for example, from its transport position within the space between the machine frame to the working position above the machine frame and with the upper portion of the mixing tower disposed on the top of the lower portion, then the two winches operate as follows:

Winch 6, which is, for example, selected as a pull winch and pull brake performs a pulling action over a range of 75° as indicated by the area 20 in FIGURE 8. Thereafter and for a range of 68° the winch becomes inoperative as designated by 21, until the dead point of the load, indicated by 0, has been reached. The winch 6 then becomes operative as a pull brake over a range 22 of 37°.

Figures 9, 10:
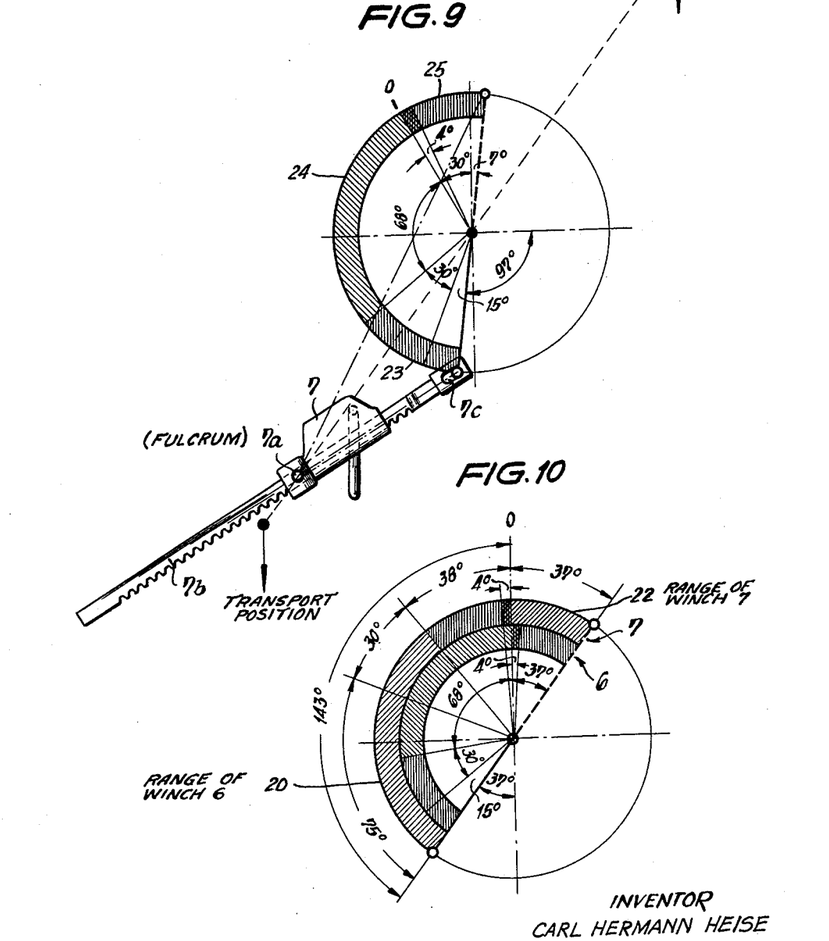
FIGURE 9 is a diagram, illustrating the operation of the push winch.
FIGURE 10 is a diagram, illustrating the cooperation of the two winches for the entire load cycle when moving the winches from the transport position to the work position.
Figure 11:
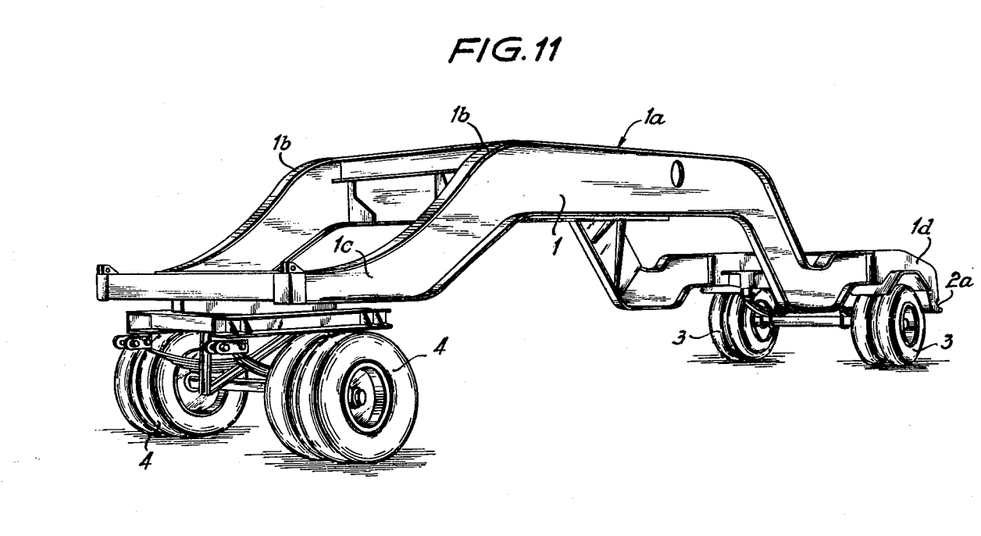
FIGURE 11 is a perspective view of the mobile machine frame illustrating the arched configuration of the latter.

The operation of the winch 7 which is selected to be the push winch and push brake is illustrated in FIGURE 9. The winch is inoperative in area 23 covering 45° whereupon it operates as a puch winch in the crisscrossed area 24 covering 98°, until the dead point 0 is reached, whereupon it becomes inoperative in area 25 over a range of 37°.

The action of the two winches 6 and 7 is simultaneous as will be easily apparent from FIGURE 10. Over a range of 45° only the winch 6 operates as a pull winch, thereafter both winches are operative for a while, e.g. winch 6 as a pull winch and winch 7 as a push winch. As will be easily apparent from FIGURE 10, winch 6 then becomes inoperative and winch 7 operates alone as a push winch, until the dead point of the load 0 is reached. Thereafter winch 7 becomes inoperative and winch 6 acts alone as a pull brake.

It will, of course, be understood that the function of the two winches can be reversed, wherein winch 7 acts as a pull winch and winch 6 operates as a push winch.

Figure 1:
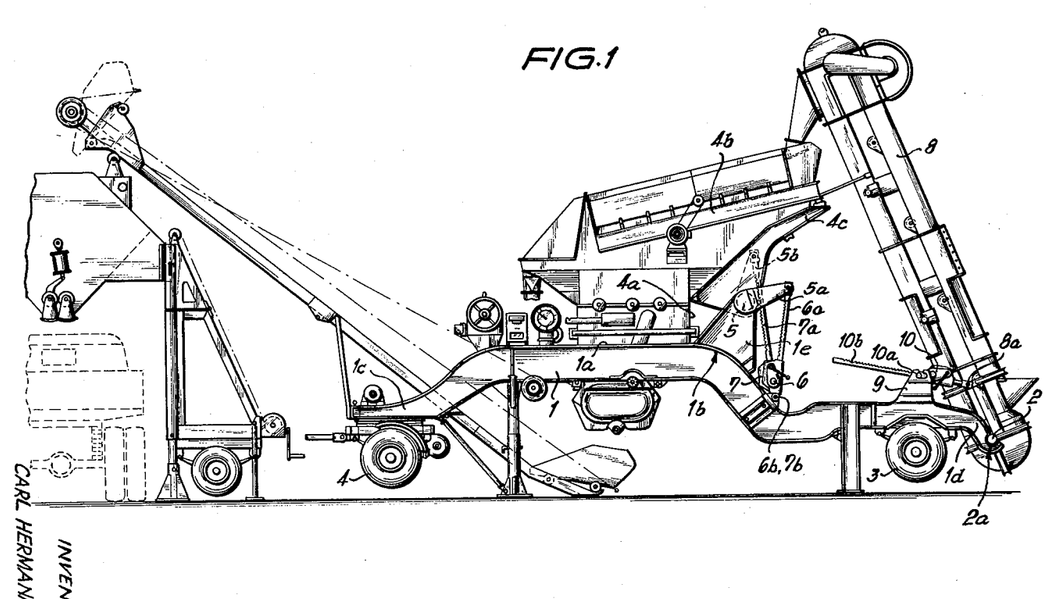
FIGURE 1 is a side elevational view of the mixing and sieving machine of the invention, comprising a mixing tower, a bucket conveyer for charging hot materials to the mixing tower and a charging elevator for loading the material from the mixing tower into a storage tank or truck, all shown in the work position.
Figure 2:
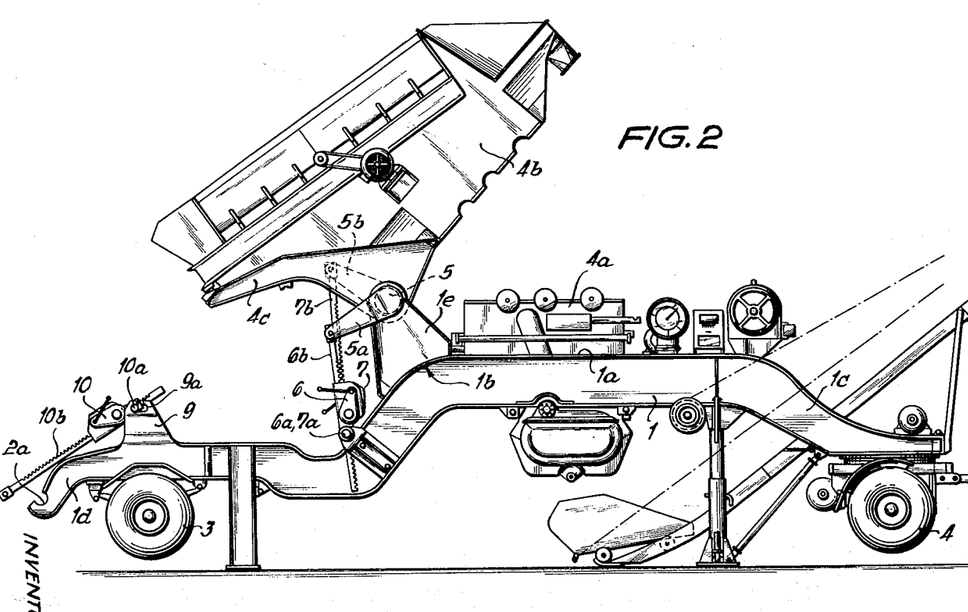
FIGURE 2 is a side elevational view of the machine of the invention, without the bucket conveyor, and illustrates how the upper part of the mixing tower is pivoted from the work position to the transport position, it being shown about half-way between these two positions.
Figure 3:
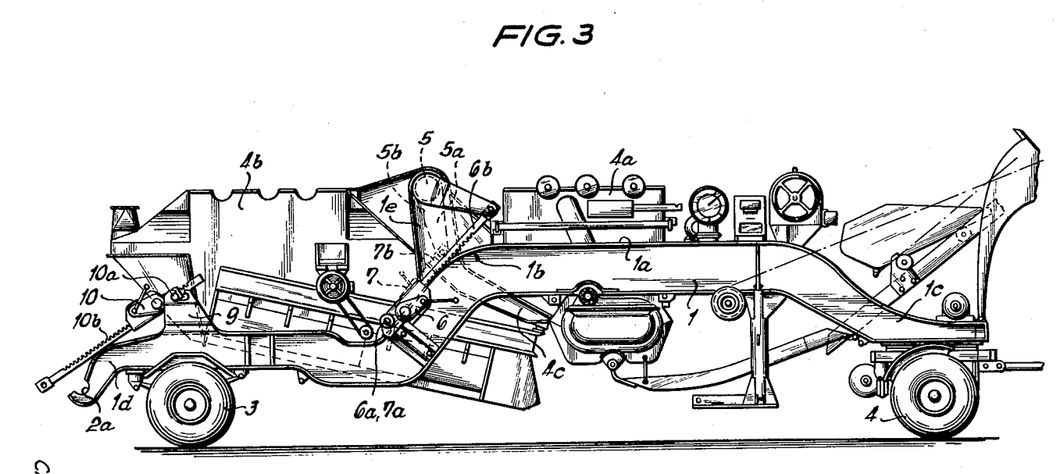
FIGURE 3 is a side elevational view of the machine of the invention without the bucket conveyer, with the upper part of the mixing tower having been mounted within the space comprised by the machine frame, this being the transport position.

By the cooperative action of the winches thus described the mixing tower is thus pivoted from the transport position into the work position, shown in FIGURES 1 and 2, or from the work position into the transport position, in which latter it rests within the frame, and is supported thereby, as shown in FIGURE 3.

Figure 4:
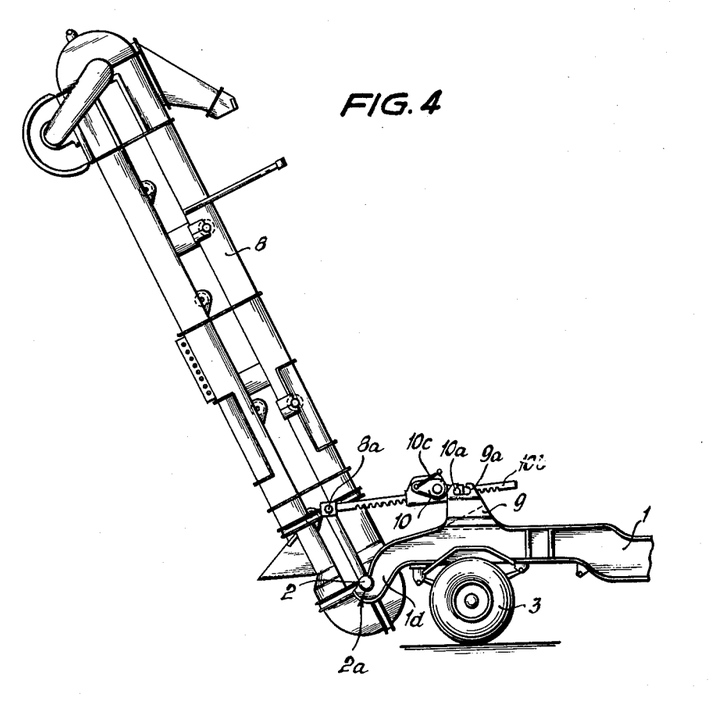
FIGURE 4 is a side elevational view of part of the mobile machine frame with the hook-shaped end portion constituting a bearing for the bucket conveyer, the latter being shown in its work position.
Figure 5:
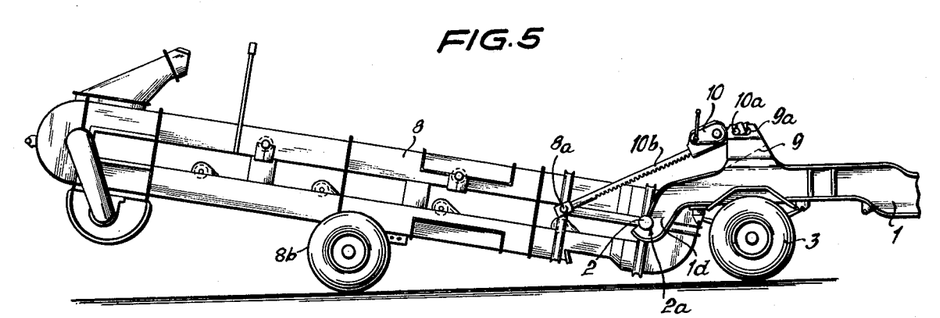
FIGURE 5 is a side elevational view of the same structure shown in FIGURE 4, but with the bucket conveyer shown resting on the ground in the transport position for being trailed by the machine frame.
Figure 6:
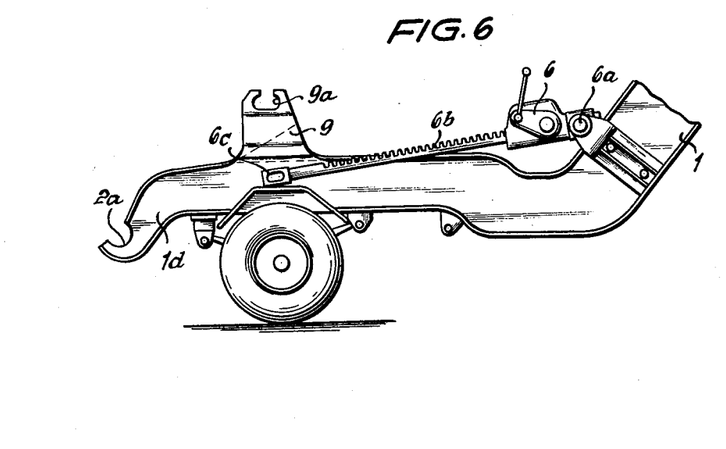
FIGURE 6 is a fragmentary side elevational view of part of the machine frame with the hand winch and rack means for moving the upper part of the mixing tower.
Figure 7:
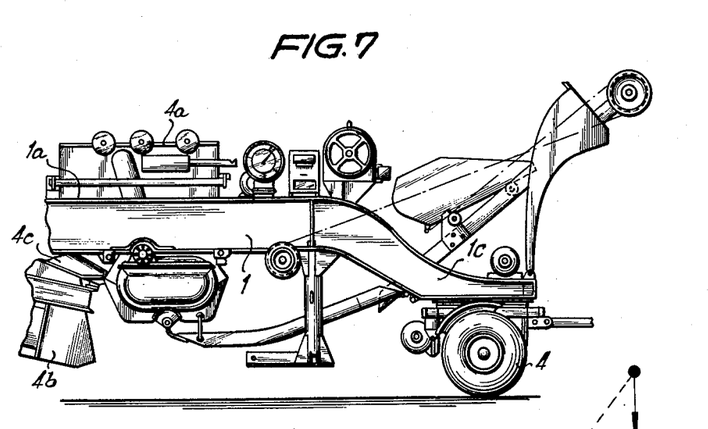
FIGURE 7 is a side elevational view of part of the machine frame.

By the action of the winches 10 the bucket conveyer 8 is moved from the work position, shown in FIGURES 1 and 4, about its pivoting shaft 2 into the transport position in which latter it rests on the ground supported by its wheels 8b, and in which position it can be trailed by chassis 1, as shown in FIGURE 5.

It will be understood that this invention is susceptible to modification in order to adapt it to different usages and conditions and, accordingly, it is desired to comprehend such modifications within this invention as may fall within the scope of the appended claims.

What I claim is:

1. Sieving and mixing machine for processing and loading building materials comprising, in combination, a mobile machine frame having an arch-like configuration with an upper, horizontally extending central portion and downwardly bent end portions, one of said end portions having at its extreme end an upwardly hook-shaped portion constituting a bearing, said machine frame defining a free space, a mixing tower consisting of two parts, a lower part and an upper part, the lower part being fixedly connected with said machine frame, and the upper part being pivotably connected with the lower part, a bucket conveyer for charging said mixing tower with hot building material, said bucket conveyer being pivotally positioned with one end in said hook-shaped portion of said machine frame, first winch means for swinging said upper part of said mixing tower by substantially 180° from its operative position above said lower part above said machine frame to its transport position within the free space in said machine frame, and second winch means connected with said bucket conveyer for pivoting the latter about said hook-shaped bearing portion of said machine frame, said winch means connected with said bucket conveyer comprising rack means pivotably engaging said bucket conveyer, and a pair of bearing blocks on said machine frame wherein said winch means for said bucket conveyer are positioned.

2. Sieving and mixing machine for processing and loading building materials as described in claim 1, further comprising a crankshaft in said upper part of said mixing tower about which the latter is pivoted, a first crank and a second crank oppositely mounted at the respective free ends of said crankshaft and spaced from each other by 60°, and said first winch means comprising a first hand winch and a first rack and a second hand winch and a second rack, said racks engaging at the respective ends of said first crank and of said second crank, respectively, one of said hand winches operating successively as a pull winch and pull brake, the other one of said winches operating successively as a push winch and push brake.

3. Sieving and mixing machine for processing and loading building materials as described in claim 2, said winch means connected with said bucket conveyer comprising a third hand winch and a fourth hand winch, one of said third and fourth hand winches operating successively as a pull winch and a pull brake, the other one of said winches operating successively as a push winch and a push brake.

4. Sieving and mixing machine for processing and loading building materials comprising, in combination, a mobile machine frame having an arch-like configuration with an upper, horizontally extending central portion and downwardly bent end portions so as to form a bridge-like structure, said machine frame defining a free space, a mixing tower consisting of two parts, a lower part and an upper part, the lower part being fixedly connected with said machine frame, and the upper part being pivotably connected with the lower part and capable of assuming an operating position resting on said lower part, and a transport position pivoted substantially 180° from its operating position, in which transport position the upper part rests within the free space in said machine frame, and a bucket conveyer for charging said mixing tower with hot building material while being in a substantially upright operating position, said bucket conveyer being pivotably positioned at one of its ends in one of the end portions of said machine frame and capable of being pivoted from said operating position into a transport position in trailing relationship with said machine frame.

References Cited in the file of this patent

UNITED STATES PATENTS

| | | |
|---|---|---|
| 921,361 | Chambers | May 11, 1909 |
| 1,673,559 | Hanak | June 12, 1928 |
| 2,395,075 | Smith | Feb. 19, 1946 |
| 2,873,939 | Oidtman | Feb. 17, 1959 |
| 2,945,683 | Martinson | July 19, 1960 |
| 2,948,519 | Bradshaw et al. | Aug. 9, 1960 |

FOREIGN PATENTS

| | | |
|---|---|---|
| 544,183 | Germany | Feb. 15, 1932 |